United States Patent [19]
Toda

[11] Patent Number: 5,336,338
[45] Date of Patent: Aug. 9, 1994

[54] BEARING COMPONENTS AND PROCESS FOR PRODUCING SAME

[75] Inventor: Kazutoshi Toda, Habikino, Japan

[73] Assignee: Koyo Seiko Co., Ltd., Osaka, Japan

[21] Appl. No.: 983,448

[22] Filed: Dec. 2, 1992

[30] Foreign Application Priority Data

Dec. 3, 1991 [JP] Japan .................. 3-318307

[51] Int. Cl.$^5$ .......... C21D 1/06; C22C 38/00
[52] U.S. Cl. .................. 148/319; 148/226; 148/229; 148/406
[58] Field of Search .............. 148/226, 229, 906, 319

[56] References Cited

U.S. PATENT DOCUMENTS

| | | | |
|---|---|---|---|
| 4,904,094 | 2/1990 | Furumura et al. | 384/492 |
| 5,122,000 | 6/1992 | Matsumoto et al. | 384/492 |

FOREIGN PATENT DOCUMENTS

| | | |
|---|---|---|
| 0013063 | 7/1980 | European Pat. Off. |
| 313953 | 2/1974 | Fed. Rep. of Germany. |
| 2-115344 | 4/1990 | Japan. |
| 1361553 | 7/1974 | United Kingdom. |
| 2244103 | 11/1991 | United Kingdom. |

OTHER PUBLICATIONS

Patent Abstracts of Japan, vol. 014, No. 322 (C-0739), Jul. 10, 1990 & JP-A-21 15 344 (Koyo Seiko Co Ltd) Oct. 21, 1988.

*Primary Examiner*—Deborah Yee
*Attorney, Agent, or Firm*—Mason, Fenwick & Lawrence

[57] ABSTRACT

A bearing component is prepared from a carburazing steel and having a surface hardness of 63 to 67 in terms of Rockwell hardness C and a surface retained austenite content of at least 20% to less than 25%. The bearing component is produced by a process including the step of carburizing and quenching a bearing component workpiece prepared from a carburizing steel and machined to a predetermined shape, the step of subjecting the resulting workpiece to a preliminary tempering treatment, the step of subjecting the tempered workpiece to a sub-zero treatment and the step of subjecting the treated workpiece to a main tempering treatment. Further, the bearing component is produced by another process including the step of carburizing and quenching a bearing component workpiece prepared from a carburizing steel and machined to a predetermined shape, the step of subjecting the resulting workpiece to a secondary hardening treatment and the step of subjecting the hardened workpiece to a main tempering treatment.

13 Claims, 6 Drawing Sheets

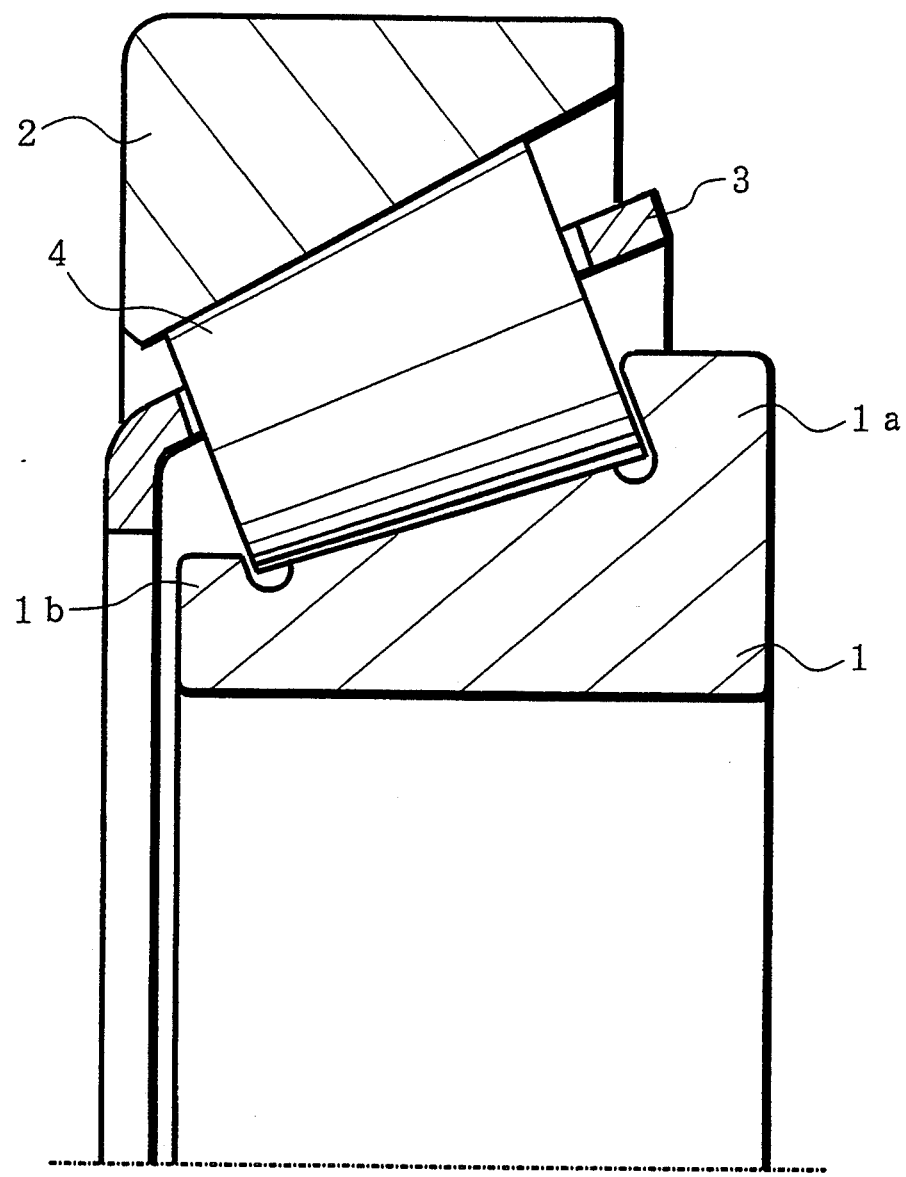
F I G. 1
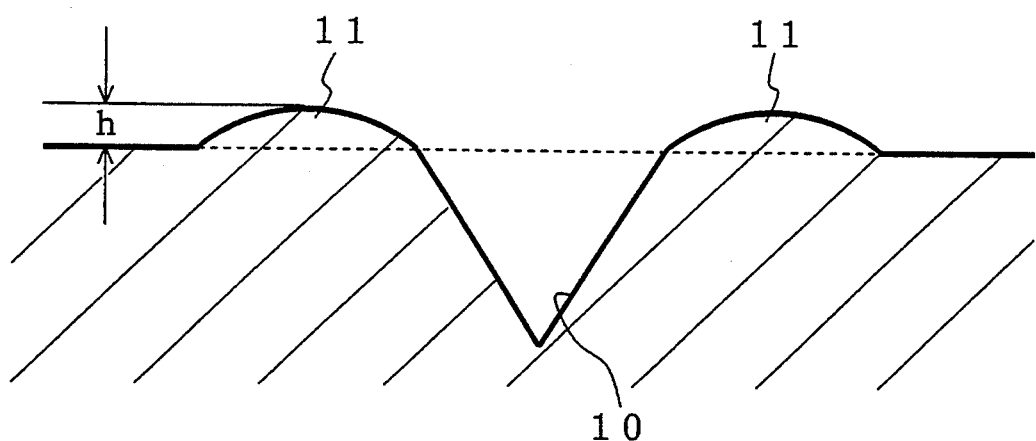
F I G. 2

BEARING COMPONENTS AND PROCESS FOR PRODUCING SAME

BACKGROUND OF THE INVENTION

The present invention relates to bearing components, and more particularly to bearing components suitable for use in bearings which are used in oils contaminated with extraneous matter having a Rockwell C hardness (hereinafter referred to as "HRC") of about 58 to about 63.

When bearings are used in oils contaminated with extraneous matter which is about 58 to about 63 in HPC, such as metal particles or molding sand, the life of the bearing reduces generally to 1/5 to 1/10 of the calculated life thereof or shorter. To improve the life of bearings in the case where they are used in contaminated oils containing extraneous matter, the present applicant has already proposed a bearing steel which is prepared from a carburizing steel and which is characterized by having a surface hardness of 63 to 66 in terms of HRC, a surface retained austenite content of 25 to 50% and a carburized case free from secondary carbide precipitates (see Unexamined Japanese Patent Publication No. 115344/1990).

However, in the case where components made of the conventional bearing steel described are used for bearings, the bearings vary in life and are not always satisfactory to use actually.

SUMMARY OF THE INVENTION

The main object of the present invention is to overcome the foregoing problem and to provide bearing components which are diminished in variations in life and which are serviceable for a prolonged period of time even when used in contaminated oils.

The bearing component embodying the invention is prepared from a carburizing steel and has a surface hardness of 63 to 67 in terms of Rockwell hardness C and a surface retained austenite content of at least 20% to less than 25%.

Thus, the surface hardness is limited to 63 to 67 in terms of HRC because if the hardness exceeds 67 in HRC, impaired toughness will result and further because if less than 63 in HRC, the surface hardness is insufficient, with the result that when the bearing incorporating the component is used in an oil contaminated with extraneous matter, the bearing component is susceptible to mars such as indentations due to the extraneous matter and originating spalling, exhibits lower wear resistance and shortens the life of the bearing. Preferably, the surface hardness is at least HRC 64.

Further the surface retained austenite content is limited to the range of at least 20% to less than 25% because contents less than 20% entail lower toughness and a higher crack propagation rate to shorten the life of bearings, and because if the content is not lower than 25%, bearings vary more greatly in life and an impaired surface hardness will result. Preferably, the upper limit of the surface retained austenite content is 24.5%.

With the bearing component described, the matrix phase of the case preferably has a carbon content of at least 0.8 wt. % because contents less than 0.8 wt. % are likely to lead to a lower strength and a shorter bearing life. The term the "case region" refers to the portion having a depth of about 50 micrometers from the surface.

The present invention provides a process for producing bearing components which includes the step of carburizing and quenching a bearing component workpiece prepared from a carburizing steel and machined to a predetermined shape, the step of subjecting the resulting workpiece to a preliminary tempering treatment, the step of subjecting the tempered workpiece to a sub-zero treatment and the step of subjecting the treated workpiece to a main tempering treatment.

In the production process stated, it is desirable to conduct the preliminary tempering treatment by maintaining the workpiece at 110° to 130° C. for at least 1 hour. The amount of unstable retained austenite contained in the workpiece increases at a temperature below 110° C. At the same temperature, the retained austenite contained in the workpiece is transformed during the subsequent step of sub-zero treatment and the surface retained austenite content can not be maintained in the range of at least 20% eventually. The retained austenite is stabilized at a temperature above 130° C. At the same temperature, the retained austenite is not readily transformed during the subsequent step of sub-zero treatment and the surface retained austenite content can not be maintained in the range of less than 25% eventually. Further in the production process described, it is desired to carry out the sub-zero treatment by maintaining the workpiece at $-50°$ to $-80°$ C. for at least 1 hour. The surface retained austenite content is not readily reduced by the transformation of the retained austenite and can not reach the eventual range of less than 25% at a temperature above $-50°$ C. The surface retained austenite content is readily reduced by the transformation and can not reach the eventual range of at least 20% at a temperature below $-80°$ C. Further preferably, the main tempering treatment is conducted by maintaining the workpiece at 140° to 175° C. for at least 2 hours. The eventual surface hardness exceeds 67 in terms of HRC and impairs toughness at a temperature below 140° C. The eventual surface hardness comes to be less than 63 in HRC and the workpiece is susceptible to mars and exhibits lower wear resistance at a temperature above 170° C.

The present invention provides another process for producing bearing components which includes the step of carburizing and quenching a bearing component workpiece prepared from a carburizing steel and machined to a predetermined shape, the step of subjecting the resulting workpiece to a secondary hardening treatment and the step of subjecting the hardened workpiece to a main tempering treatment.

In this process, it is desirable to conduct the secondary hardening treatment by press quenching for hardening, i.e., by heating the workpiece to at least 800° C. and quenching the workpiece immediately thereafter. Alternatively, the secondary hardening treatment may be conducted by heating the workpiece at 800° to 850° C. for at least 0.5 hour and thereafter quenching the workpiece for hardening. The main tempering treatment is conducted preferably by maintaining the workpiece at 140° to 175° C. for at least 2 hours.

When incorporating the bearing components of the present invention, bearings have a prolonged life even if used in contaminated oils. The bearings can further be diminished in variations in life.

The processes of the invention ensure facilitated production of bearing components.

The present invention will be described in greater detail with reference to the accompanying drawings.

BRIEF DESCRIPTION OF THE DRAWINGS

FIG. 1 is a fragmentary view in vertical section showing an embodiment of the invention, i.e., a tapered roller bearing wherein the inner and outer rings are bearing components of the invention;

FIG. 2 is an enlarged fragmentary view showing an indentation formed in a raceway surface by a Vickers indentor;

DESCRIPTION OF THE PREFERRED EMBODIMENTS

Figure 3:
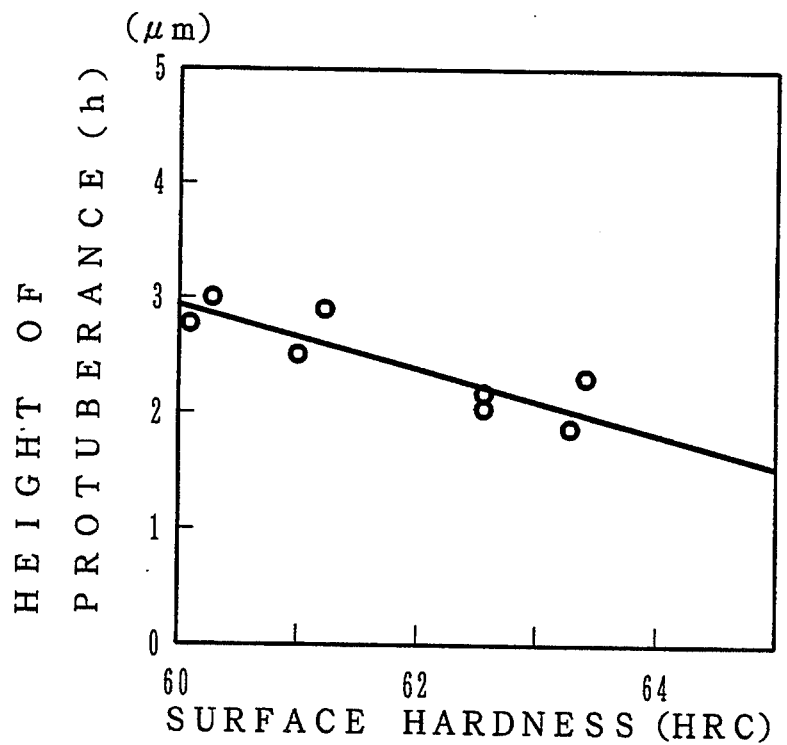
FIG. 3 is a graph showing the relationship between the height of ridge around such indentations and the surface hardness of raceway surfaces.

FIG. 1 shows a tapered roller bearing, which comprises an inner ring 1 having a large flange 1a and a small flange 1b, an outer ring 2, a retainer 3 blanked out in the form of a cone and a plurality of tapered rollers 4 held by the retainer 3.

The inner and outer rings 1 and 2 are prepared from a carburizing steel containing, for example, 0.1 to 1.0 wt. % of C, such as JIS SCr420 material or SAE5120 material, and are adapted to have a surface hardness of HRC 63 to 67 and a surface retained austenite content of at least 20% to less than 25%. The tapered rollers 4 are made of bearing steel such as JIS SUJ2 or SAE52100.

The lower limit value of the surface hardness of the inner and outer rings 1, 2 is HRC 63 because the surface hardness, if less than HRC 63, is insufficient and entails the following drawbacks in the case where the bearing incorporating these components is used in an oil contaminated with extraneous matter. The raceway surfaces of the inner and outer rings 1, 2 are susceptible to mars such as indentations due to the extraneous matter and originating spalling, the rings exhibit lower wear resistance, and protuberances formed around indentations exfoliate the rollers 4 to shorten the bearing life.

The results of the following experiments conducted by us have substantiated the reason why the lower limit of the surface hardness of the inner and outer rings 1, 2 should be HRC 63.

Figure 4:
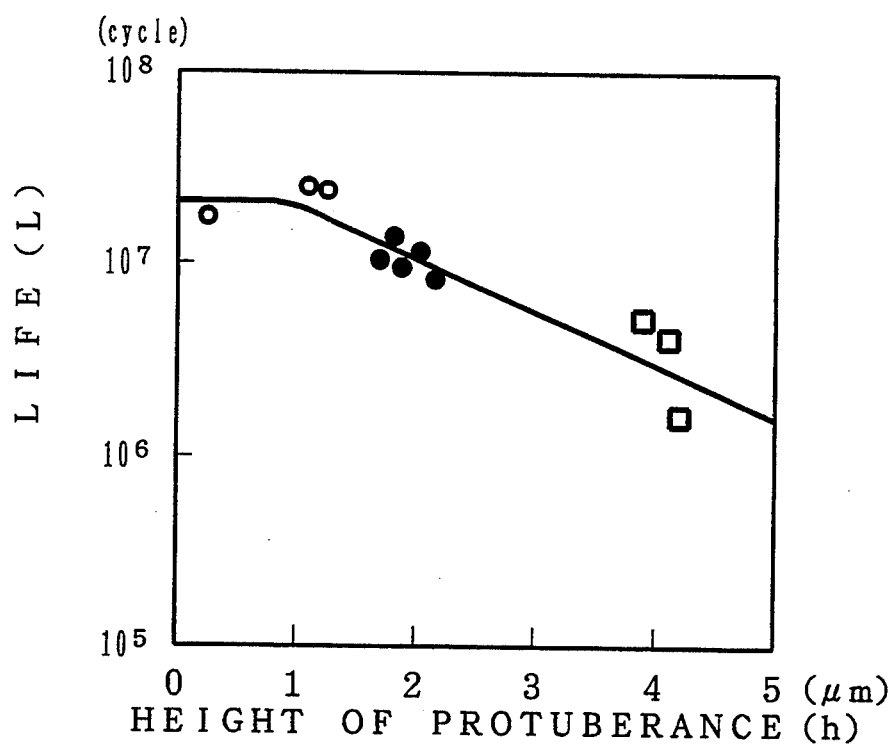
FIG. 4 is a graph showing the relationship between the height of ridge around indentations and the life of bearings.

When indentations 10 are formed in raceway surfaces under a specified load using a Vickers indentor as shown in FIG. 2, a ridge 11 is formed around the indentation 10. FIG. 3 shows the relationship between the height h of such ridge 11 and the surface hardness (HRC) of the races. It is seen that the smaller the surface hardness, the greater is the height h of the ridge 11. FIG. 4 shows the relationship between the height h of ridge 11 and the life of bearings. The greater the height h of ridge 11, the shorter is the life. The result of FIG. 4 was obtained by preparing two disks, forming a plurality of indentations by a Vickers indentor on a circle on a surface of one of the disks concentric with the disk, interposing a plurality of balls between the two disks and rotating the disks while subjecting the two disks to a thrust load to roll the balls on the concentric circle on which the indentations were formed. In FIG. 4, the blank circular mark represents spalling occurring at a portion other than the indentations. Spalling occurring at indented portions is represented by a solid circular mark, and spalling occurring in the ball by a blank square mark. FIGS. 3 and 4 reveal that when the surface hardness is less than HRC 63, the ridge 11 around the indentation 10 has a great height h, consequently shortening the life of bearings. FIG. 3 further indicates that if the surface hardness is less than HRC 63, the height h is predominantly in the range of 2 to 3 micrometers, which is liable to cause spalling originating at indentations as will be apparent from FIG. 4.

Figure 5:
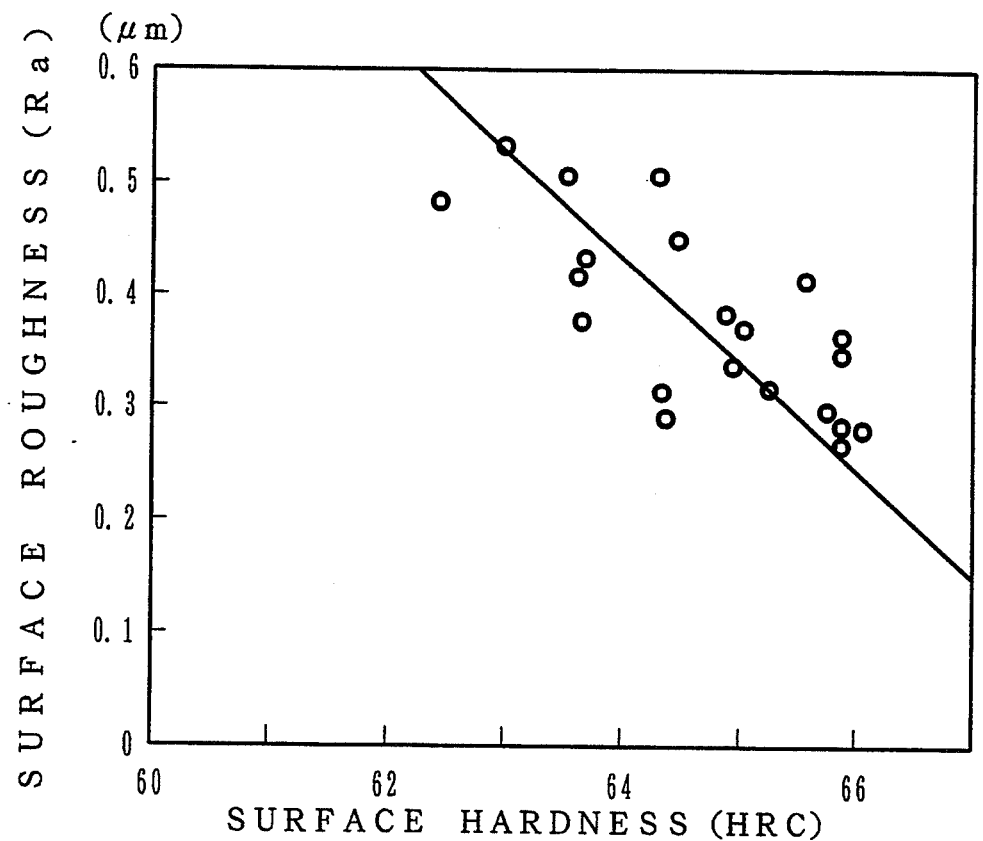
FIG. 5 is a graph showing the relationship between the surface hardness of inner and outer rings and the surface roughness thereof after testing, as determined by subjecting bearings to a life test in a contaminated oil.

FIG. 5 shows the result obtained by subjecting bearings to a life test in a contaminated oil, i.e., the relationship of the surface hardness (HRC) of the inner and outer rings 1, 2 with the roughness of the raceway surfaces (average roughness Ra on the center line) after testing. The roughness of the raceway surfaces before testing was 0.1 micrometer in terms of average roughness Ra on the center line. FIG. 5 shows that when the surface hardness is less than HRC 63, the surface roughness after testing is great. This indicates reduced wear resistance. Preferably, the surface hardness is at least HRC 64.

The reason why the lower limit of hardness of the inner and outer raceway surfaces should be HRC 63 will be understood from FIGS. 3 to 5.

The surface retained austenite content of the inner and outer rings 1, 2 should be less than 25%, preferably up to 24.5% because contents not lower than 25% result in greater variations in the life of bearings and a lower surface hardness.

The above reason why the surface retained austenite content of the inner and outer rings 1, 2 should be less than 25% has become apparent from the result of the following experiment conducted by us.

Figure 6:
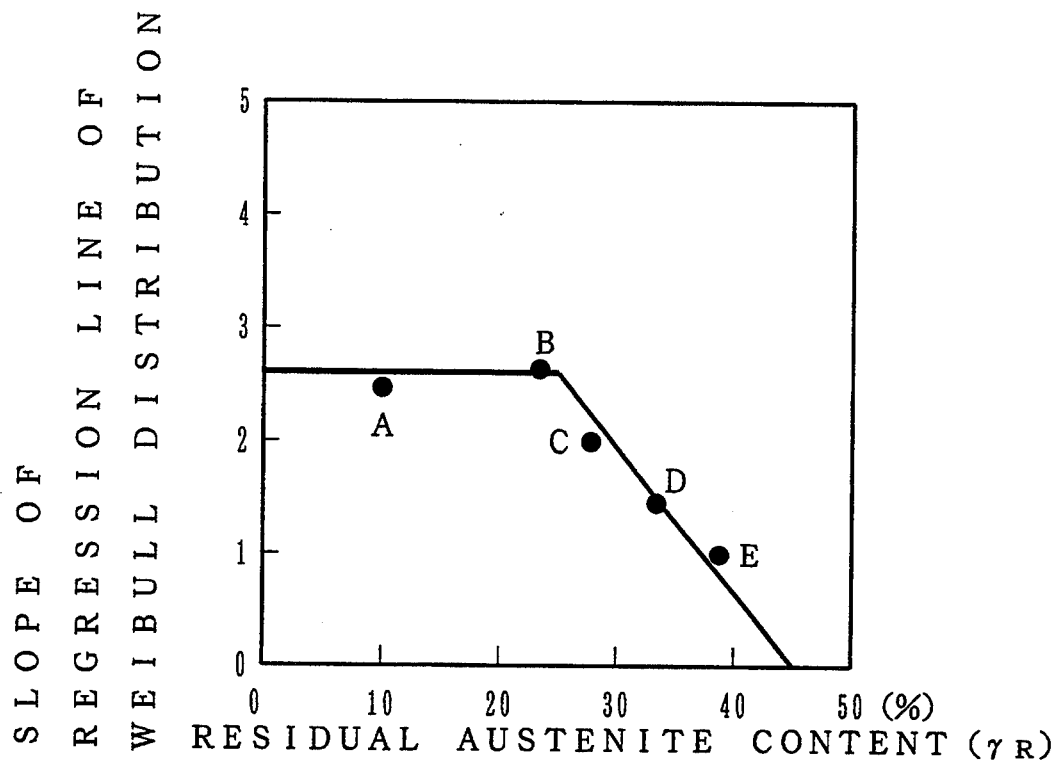
FIG. 6 is a graph showing the relationship between the slope of regression lines of Weibull distributions as plotted on Weibull probability paper and the surface retained austenite content.

More specifically, we conducted a life test to establish the relationship between the surface retained austenite content ($\gamma R$) and the slope of regression lines of Weibull distributions as plotted on Weibull probability paper. The result is shown in FIG. 6, which reveals that when the surface retained austenite content is not lower than 25%, the slope decreases to result in greater variations in the life of bearings, which are therefore unfit to actual use. Table 1 shows the retained austenite contents ($\gamma R$: %) of the samples A to E shown in FIG. 5 and the corresponding slopes.

TABLE 1

| Sample | $\gamma R$ (%) | Slope |
|---|---|---|
| A | 12 | 2.4 |
| B | 24.5 | 2.5 |
| C | 25.5 | 2.0 |
| D | 33 | 1.5 |
| E | 39 | 1.0 |

Figure 7:
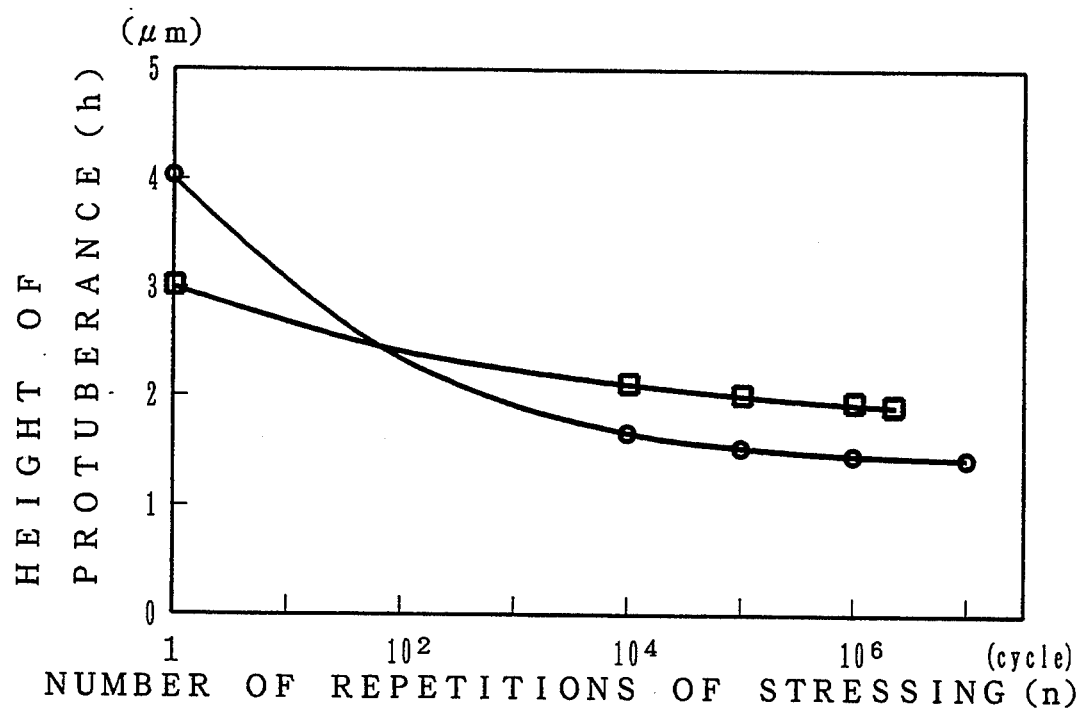
FIG. 7 is a graph showing the relationship between the height of ridge around the indentation and the number of repetitions of stressing.

FIG. 7 shows the relationship between the height h of ridge 11 and the number n of repetitions of stressing, as determined by testing in the same manner as for obtaining the result of FIG. 4. In FIG. 7, the blank circular marks represent the result achieved by disks having a surface hardness of HRC 62.2 and a surface retained austenite content of 16.9%, and the blank square marks represent the result attained by disks having a surface hardness of HRC 62.9 and a surface retained austenite content of 31.5%. FIG. 7 reveals that the height h of the ridge 11 formed around the indentation 10 varies and gradually decreases with time with use, but does not decrease below a certain value despite an increase in the number of repetitions of stressing if the retained austenite content is great. The fact that the height h of the ridge 11 does not increase when the retained austenite content is high is attributable to the work hardening of the ridge 11.

The reason why the retained austenite content of the raceway surfaces of the inner and outer rings 1, 2 should be less than 25% will be understood from FIGS. 6 and 7.

The matrix phase of the cases of the inner and outer rings 1, 2 is preferably at least 0.8 wt. % in carbon content. Carbon contents less than 0.8 wt. % result in lower strength and are likely to shorten the life of the bearing. The term "case region" meaning a surface layer refers to the portion having a depth of about 50 micrometers from the surface. If the matrix phase of this portion is at least 0.8 wt. % in carbon content, impairment of strength can be precluded. Stated more specifically, spalling leading to a shorter life occurs at a depth of about 10 micrometers from the surface, whereas when the carbon content of matrix phase of the case having a depth of about 50 micrometers from the surface is at least 0.8 wt. %, a great strength is available to inhibit spalling.

The inner and outer rings 1, 2 are produced from a bearing component workpiece prepared from a carburizing steel and machined to a predetermined shape, for example, by carburizing and quenching the workpiece, then subjecting the workpiece to a preliminary tempering treatment, thereafter subjecting the workpiece to a sub-zero treatment and further subjecting the workpiece to a main tempering treatment.

The carburizing and quenching treatment is conducted by maintaining the workpiece at 900° to 950° C. for a predetermined period of time. The carburizing and quenching treatment results in a surface hardness of 55 to 65 in HRC and a retained austenite content of about 30 to about 65%. The preliminary tempering treatment is conducted by maintaining the resulting workpiece at 110° to 130° C. for at least 1 hour. The sub-zero treatment is conducted by maintaining the tempered workpiece at −50° to −80° C. for at least 1 hour. The sub-zero treatment results in a surface hardness of about 63 to about 68 in HRC and a retained austenite content of about 20 to about 25%.

Alternatively, the inner and outer rings 1, 2 are prepared by subjecting the machined workpiece to the same carburizing and quenching treatment as above, then subjecting the workpiece to a secondary hardening treatment, further subjecting the workpiece to the same preliminary tempering treatment and sub-zero treatment as stated above and thereafter subjecting the resulting workpiece to a main tempering treatment. The secondary hardening treatment is conducted by heating the workpiece at 800° to 850° C. for at least 0.5 hour and thereafter hardening the workpiece, for example, by quenching in oil.

The main tempering treatment is carried out by maintaining the workpiece at 140° to 175° C. for at least 2 hours.

These processes provide a desired retained austenite content. More specifically, when the sub-zero treatment is conducted without the preliminary tempering treatment, austenite is liable to transform into martensite to result in a reduced retained austenite content, whereas the preliminary tempering treatment, when conducted, stabilizes unstable retained austenite resulting from the carburizing and quenching treatment, making it difficult for the austenite to become martensite even when the sub-zero treatment is conducted.

Further alternatively, the inner and outer rings 1, 2 are prepared by subjecting the machined workpiece to the same carburizing and quenching treatment as above, then subjecting the workpiece to a secondary hardening treatment and thereafter subjecting the workpiece to the same main tempering treatment as stated above. In this process, the secondary hardening treatment is conducted by the press quenching method wherein the workpiece as held by a press is heated to 900° to 950° C. and quenched immediately after heating. Alternatively, the secondary hardening treatment is carried out by heating the workpiece at 800° to 850° C. for at least 0.5 hour and thereafter hardening the workpiece, for example, by oil quenching. The secondary hardening treatment results in a surface hardness of about 63 to about 68 in HRC and a retained austenite content of about 20 to about 25%.

With this process, the secondary hardening treatment preceding the main tempering treatment affords stabilized retained austenite and an increased hardness.

The rollers 4 are prepared by forming pieces of predetermined shape, for example, from JIS SUJ2 or SAE52100, subjecting the pieces to an ordinary hardening treatment in which the pieces are maintained at 800° to 850° C. for at least 0.5 hour, then subjecting the pieces to a sub-zero treatment in which the pieces are maintained at −50° to −80° C. for at least 1 hour, followed by standing in air, and subsequently subjecting the pieces to a tempering treatment in which the pieces are maintained at 140° to 180° C. for at least 2 hours and thereafter cooled in air. Preferably, the rollers 4 have the same surface hardness as the inner and outer rings 1, 2, i.e., HRC 63 to 67.

EXAMPLES

Inner and outer ring workpieces for tapered roller bearings were prepared from SAE5120 material having a carbon content of 0.2 wt. % and subjected to various heat treatments to obtain seven kinds of inner and outer rings, No. 1 to No. 7, which were different in surface hardness (HRC) and surface retained austenite content as listed in Table 2.

With reference to Table 2, the heat-treating condition A involves a usual carburizing and quenching treatment wherein the workpiece was maintained at 930° C. for 5 hours for carburization and thereafter maintained at a lowered temperature of 850° C. for 0.5 hour for quenching, a preliminary tempering treatment wherein the workpiece was maintained at 120° C. for 1 hour and thereafter cooled in air, a sub-zero treatment wherein the workpiece was maintained at −70° C. for 2 hours and thereafter allowed to stand in air, and a main tempering treatment wherein the workpiece was maintained at 160° C. for 2 hours and thereafter cooled in air, these treatments being conducted in the order mentioned.

The heat-treating condition B is the same as the heat-treating condition A with the exception of a secondary hardening treatment which was conducted after the carburizing and quenching treatment and before the preliminary tempering treatment and in which the workpiece was maintained at 830° C. for 30 minutes.

The heat-treating condition C is the same as the heat-treating condition A except that the preliminary tempering treatment was not conducted.

The heat-treating condition D is the same as the heat-treating condition A with the exception of not conducting the preliminary tempering treatment and the sub-zero treatment, and maintaining the workpiece at 180° C. for the main tempering treatment.

The heat-treating condition E is the same as the heat-treating condition B with the exception of not conducting the preliminary tempering treatment and the sub-zero treatment, and maintaining the workpiece at 180° C. for the main tempering treatment.

On the other hand, tapered roller workpieces were prepared from JIS SUJ2 material and heat-treated by subjecting the workpiece first to a usual hardening treatment wherein the workpiece was maintained at 830° C. for 30 minutes, then to a sub-zero treatment wherein the workpiece was maintained at −70° C. for 2 hours and subsequently allowed to stand in air, and thereafter to a main tempering treatment wherein the workpiece was maintained at 170° C. for 2 hours and then cooled in air.

The inner and outer rings, Nos. 1 to 7, and the rollers thus heat-treated and equivalent to these rings in surface hardness were assembled into tapered roller bearings, which were then tested for $B_{10}$ life in a lubricant containing 1.06 g of high-speed steel powder per liter thereof. Table 2 shows the result along with the surface hardness (HRC), retained austenite content and case matrix carbon content.

TABLE 2

| Ring No. | Surface hardness (HRC) | Retained austenite content (%) | Heat-treating condition | C content (wt. %) | $B_{10}$ life (hours) |
|---|---|---|---|---|---|
| 1 | 65.5 | 24.3 | A | 0.9 | 57.8 |
| 2 | 65.6 | 22.0 | B | 0.8 | 55.0 |
| 3 | 64.2 | 24.0 | A | 0.8 | 54.5 |
| 4 | 63.1 | 23.0 | A | 0.8 | 53.0 |
| 5 | 65.0 | 12.9 | C | 0.9 | 31.3 |
| 6 | 62.1 | 28.4 | D | 0.9 | 16.3 |
| 7 | 65.6 | 21.2 | E | 0.7 | 30.0 |

The result of Table 2 reveals that the bearings incorporating the inner and outer rings, No. 1, 2, 3, 4 or 5 have a longer life than those incorporating the inner and outer rings, No. 5, 6 or 7.

Figure 8:
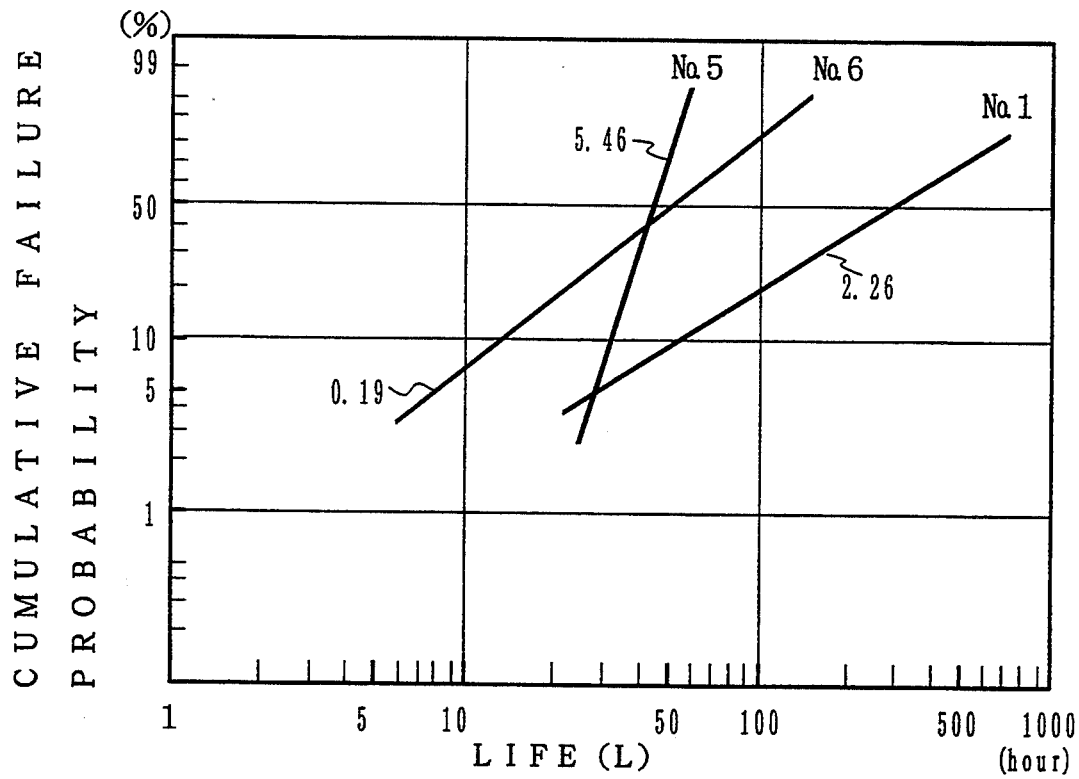
FIG. 8 is a graph showing the relationship between the slope of regression lines of Weibull distributions as plotted on Weibull probability paper and the surface retained austenite content, as determined by a life test of bearings wherein Nos. 1, 5 and 6 inner and outer rings were used.

FIG. 8 shows Weibull distributions obtained by plotting on Weibull probability paper the test data as to the bearings incorporating the inner and outer rings, No. 1, 5 or 6. In FIG. 8, the numerical value beside each line indicates the slope of the line.

The result shown indicates that the bearing including the inner and outer rings, No. 1 has a longer life than the bearings including the inner and outer rings, No. 5 or 6. It is also seen that the slope of Weibull distribution line of the test data as to the bearing including the No. 1 rings is greater than the slope of the corresponding line for the bearing incorporating No. 6 rings, this indicating diminished variations in life.

Next, inner and outer ring workpiece for tapered roller bearings were prepared from SAE5120 material having a carbon content of 0.2 wt. % and subjected to various heat treatments to obtain 65 kinds of inner and outer rings, No. 8 to No. 72, which were different in surface hardness (HRC) and surface retained austenite content ($\gamma R$: %) as listed in Table 3.

The inner rings were produced under the heat-treating condition F or G shown in Table 3, and the outer rings under the heat-treating condition H or G shown in Table 3.

The heat-treating condition F is the same as the heat-treating condition A except that the temperature for the sub-zero treatment was −60° C.

The heat-treating condition G is the same as the heat-treating condition A with the exception of not conducting the preliminary tempering treatment and the sub-zero treatment, and maintaining the workpiece at 180° C. for the main tempering treatment.

The heat-treating condition H involves a usual carburizing and quenching treatment wherein the workpiece was maintained at 930° C. for 5 hours for carburization and thereafter maintained at a lowered temperature of 850° C. for 0.5 hour for quenching, a secondary hardening treatment wherein the workpiece as held in a press was heated to 900° to 950° C. and quenched immediately after heating for press quenching, and a main tempering treatment wherein the workpiece was maintained at 160° C. and thereafter cooled in air, these treatments being conducted in the order mentioned.

TABLE 3

| Ring No. | Surface hardness (HRC) | Retained austenite content (%) | Heat-treating condition Inner ring | Heat-treating condition Outer ring |
|---|---|---|---|---|
| 8 | 65.0 | 23.4 | F | H |
| 9 | 65.0 | 23.3 | F | H |
| 10 | 65.4 | 24.0 | F | H |
| 11 | 65.3 | 22.9 | F | H |
| 12 | 65.3 | 23.0 | F | H |
| 13 | 65.3 | 23.1 | F | H |
| 14 | 65.4 | 23.4 | F | H |
| 15 | 65.9 | 23.4 | F | H |
| 16 | 65.7 | 23.3 | F | H |

TABLE 3-continued

| Ring No. | Surface hardness (HRC) | Retained austenite content (%) | Heat-treating condition Inner ring | Heat-treating condition Outer ring |
|---|---|---|---|---|
| 17 | 65.8 | 23.5 | F | H |
| 18 | 65.3 | 22.8 | F | H |
| 19 | 65.8 | 22.7 | F | H |
| 20 | 65.7 | 22.8 | F | H |
| 21 | 65.5 | 23.0 | F | H |
| 22 | 65.7 | 23.5 | F | H |
| 23 | 65.3 | 23.5 | F | H |
| 24 | 65.1 | 23.9 | F | H |
| 25 | 65.3 | 23.5 | F | H |
| 26 | 65.2 | 23.0 | F | H |
| 27 | 65.8 | 23.1 | F | H |
| 28 | 61.9 | 25.1 | G | G |
| 29 | 62.2 | 26.5 | G | G |
| 30 | 62.8 | 30.1 | G | G |
| 31 | 61.5 | 27.0 | G | G |
| 32 | 62.7 | 25.5 | G | G |
| 33 | 62.0 | 26.0 | G | G |
| 34 | 62.0 | 26.0 | G | G |
| 35 | 62.0 | 25.5 | G | G |
| 36 | 62.1 | 27.0 | G | G |
| 37 | 62.2 | 26.1 | G | G |
| 38 | 61.9 | 26.3 | G | G |
| 39 | 62.0 | 28.0 | G | G |
| 40 | 61.9 | 26.3 | G | G |
| 41 | 62.3 | 27.4 | G | G |
| 42 | 61.7 | 26.4 | G | G |
| 43 | 61.8 | 26.3 | G | G |
| 44 | 62.0 | 29.5 | G | G |
| 45 | 62.2 | 28.0 | G | G |
| 46 | 62.6 | 28.4 | G | G |
| 47 | 62.0 | 26.3 | G | G |
| 48 | 65.3 | 23.0 | F | H |
| 49 | 65.4 | 23.3 | F | H |
| 50 | 61.5 | 27.0 | G | G |
| 51 | 62.0 | 27.5 | G | G |
| 52 | 65.1 | 23.0 | F | H |
| 53 | 65.4 | 23.5 | F | H |
| 54 | 65.0 | 23.5 | F | H |
| 55 | 66.0 | 22.9 | F | H |
| 56 | 65.9 | 23.1 | F | H |
| 57 | 65.3 | 22.8 | F | H |
| 58 | 62.7 | 27.3 | G | G |
| 59 | 62.0 | 27.5 | G | G |
| 60 | 62.1 | 26.0 | G | G |
| 61 | 62.3 | 27.0 | G | G |
| 62 | 61.9 | 26.3 | G | G |
| 63 | 65.8 | 23.0 | F | H |
| 64 | 65.3 | 23.9 | F | H |
| 65 | 65.3 | 23.5 | F | H |
| 66 | 65.7 | 22.8 | F | H |
| 67 | 65.8 | 23.3 | F | H |
| 68 | 62.6 | 25.1 | G | G |
| 69 | 62.0 | 26.7 | G | G |
| 70 | 61.7 | 30.0 | G | G |
| 71 | 61.9 | 26.9 | G | G |
| 72 | 61.9 | 25.6 | G | G |

On the other hand, tapered roller workpieces were prepared from JIS SUJ2 material and heat-treated by subjecting the workpiece first to a usual hardening treatment wherein the workpiece was maintained at 830° C. for 30 minutes and hardened, then to a sub-zero treatment wherein the workpiece was maintained at −60° C. for 2 hours and thereafter allowed to cool in air, and subsequently to a main tempering treatment wherein the workpiece was maintained at 170° C. for 2 hours and thereafter cooled in air (heat-treating condition X), whereby tapered rollers were produced. Further workpieces the same as those mentioned above were heat-treated by subjecting the workpiece first to a usual hardening treatment wherein the workpiece was maintained at 830° C. for 30 minutes and hardened and then to a main tempering treatment wherein the workpiece was maintained at 180° C. for 2 hours and thereafter cooled in air (heat-treating condition Y), whereby tapered rollers were produced.

Figure 9:
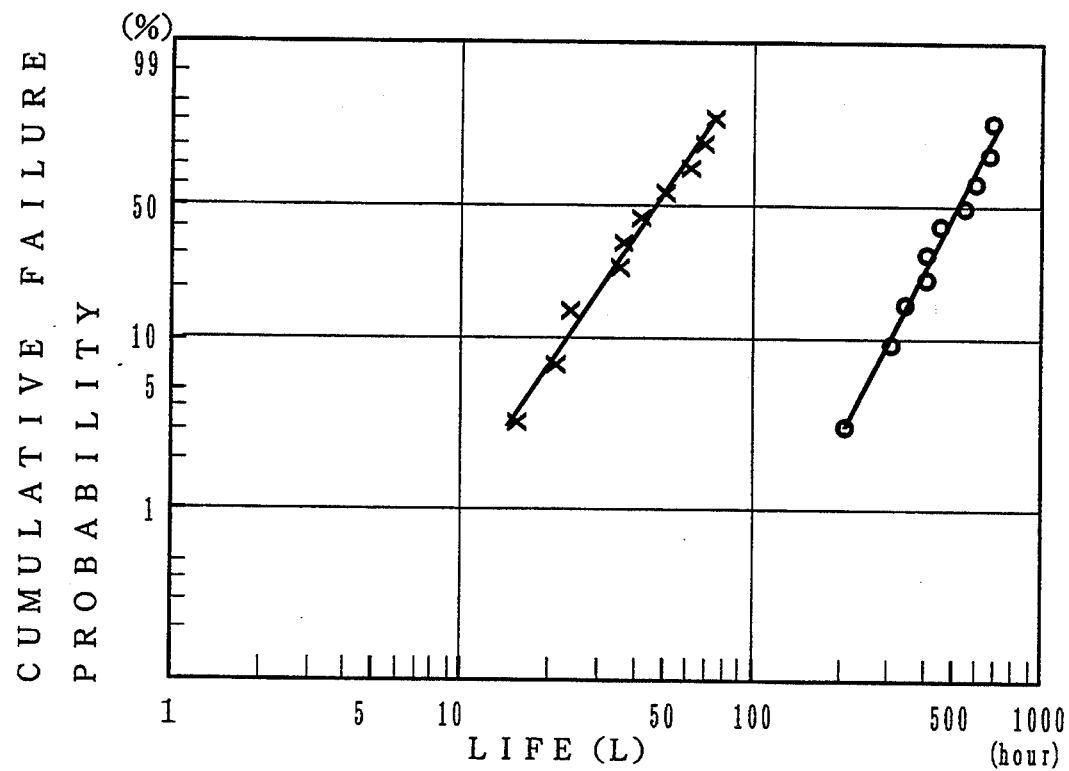
FIG. 9 is a graph showing the relationship between the slope of regression lines of Weibull distributions as plotted on Weibull probability paper and the surface retained austenite content, as determined by a life test of bearings wherein Nos. 8 to 47 inner and outer rings were used.

The inner and outer rings, No. 8 to No. 27, and the tapered rollers prepared under the heat-treating condition X and equivalent in surface hardness to the rings were assembled into tapered roller bearings. Further the inner and outer rings, No. 28 to No. 47, and the rollers prepared under the heat-treating condition Y and equivalent in surface hardness to the rings were assembled into tapered roller bearings. These bearings were subjected to a life test under an axial load of 13.7 kN and a radial load of 20.6 kN in a lubricant containing per liter thereof 0.55 g of extraneous matter, 27 micrometers in mean particle size, 50 micrometers in maximum particle size and HRC 65 in hardness, and 0.55 g of extraneous matter, 125 micrometers in mean particle size, 150 micrometers in maximum particle size and HRC 60 in hardness. FIG. 9 shows Weibull distributions obtained by plotting the test data on Weibull probability paper. In FIG. 9, the circular marks represent the result achieved by the use of bearing rings, No. 8 to No. 27, and the marks X represent the result achieved by the use of bearings, No. 28 to No. 47.

Figure 10:
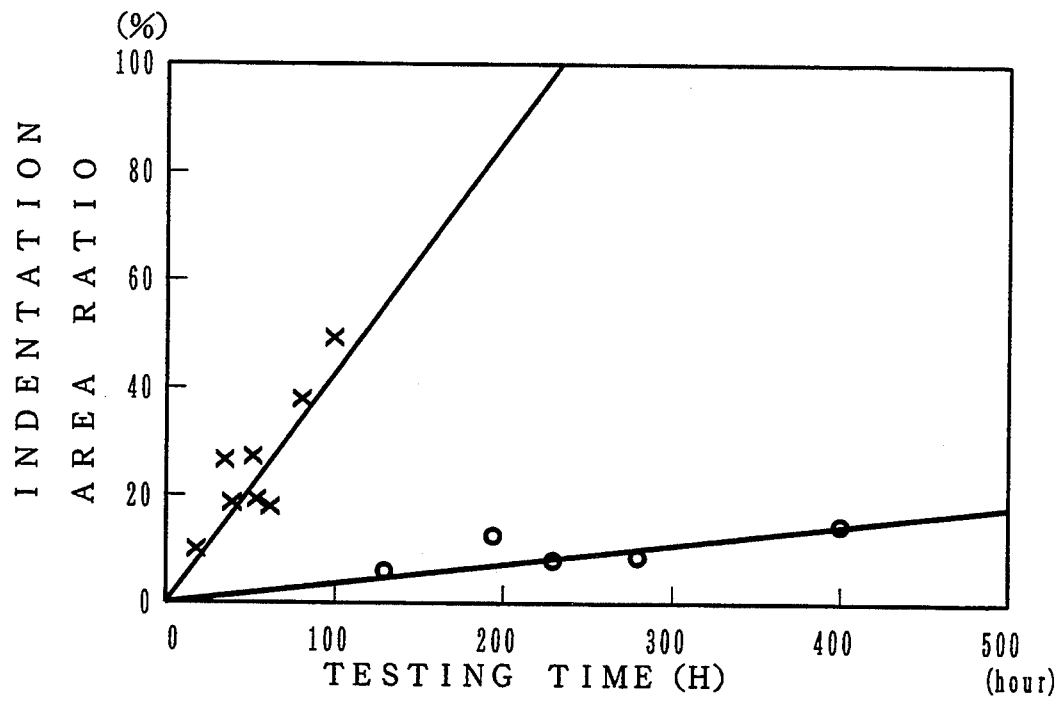
FIG. 10 is a graph showing the relationship between the indentation area ratio and the running time, as determined for bearings wherein Nos. 8 to 17 and 28 to 37 inner and outer rings were used.

Also established by the life test was the relationship between the testing time and the ratio of the area of the indentations produced by the test in the raceway surfaces of each pair of inner and outer rings to the overall raceway surface. The results are shown in FIG. 10, in which the circular marks represent the result obtained with the inner and outer rings, No. 8 to No. 17, and the marks X represent the result obtained with the rings, No. 28 to No. 37.

Next, the inner rings, Nos. 48 to 51 listed in Table 3, were fitted to a shaft with varying circumferential stress, maintained at a temperature of 120° C. for a predetermined period of time and then checked for dimensional variation ratio, Δd/d where Δd is the inside diameter after testing minus the inside diameter before testing, and d is the inside diameter before testing. Table 11 shows the result.

Next, the inner rings, No. 52 to No. 62 of Table 3, were checked for the crushing load on the large rib. The load was applied axially of the ring at a rate of 1 kN/sec. Table 4 shows the result.

TABLE 4

| Inner ring No. | Crushing load (kN) |
|---|---|
| 52 | 64.5 |
| 53 | 53.3 |
| 54 | 50.1 |
| 55 | 59.0 |
| 56 | 63.2 |
| 57 | 60.3 |
| 58 | 41.0 |
| 59 | 52.0 |
| 60 | 47.3 |
| 61 | 54.7 |
| 62 | 42.3 |

Next, the inner and outer rings, No. 63 to No. 67 of Table 3, and tapered rollers formed from JIS SUJ2 material and prepared by a heat treatment under the foregoing heat-treating condition X were assembled into tapered roller bearings. On the other hand, the inner and outer rings, No. 68 to No. 72, and tapered rollers formed from JIS SUJ2 material and prepared by a heat treatment under the foregoing heat-treating condition Y were assembled into tapered roller bearings.

Figure 12:
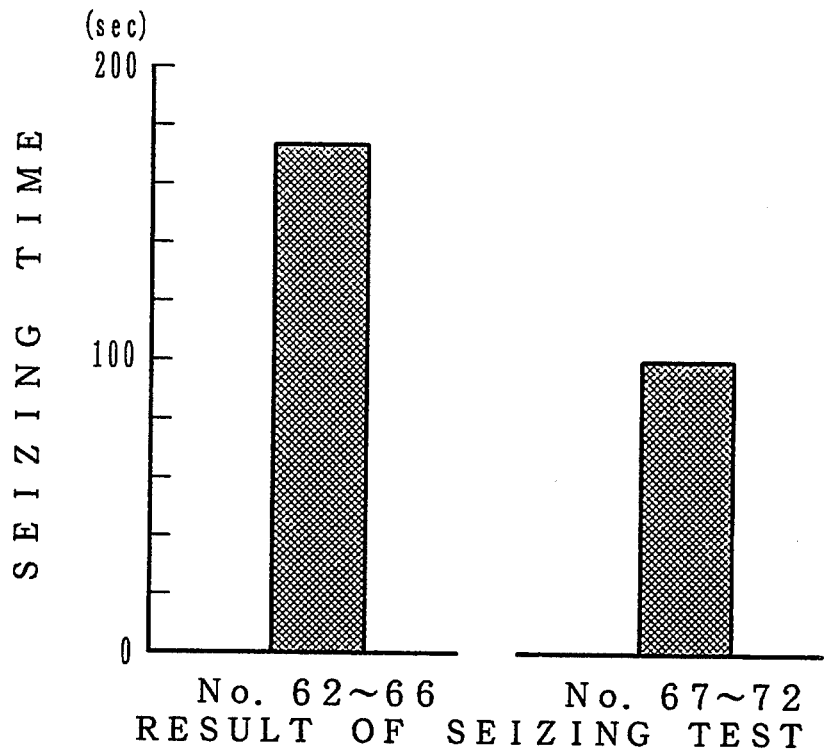
FIG. 12 is a graph showing seizure occurrence time as determined for bearings wherein Nos. 63 to 72 inner and outer rings were used.

These bearings were run in for 30 minutes with oil supplied thereto in circulation, thereafter allowed to stand at rest for 5 minutes with the supply of oil discontinued and subsequently brought into operation again with no oil supply to measure the time taken for seizure to take place. The bearings were thus tested under an axial load of 3.9 kN at a speed of rotation of 5885 r.p.m. and oil temperature of 135° C. FIG. 12 shows the result.

Figure 11:
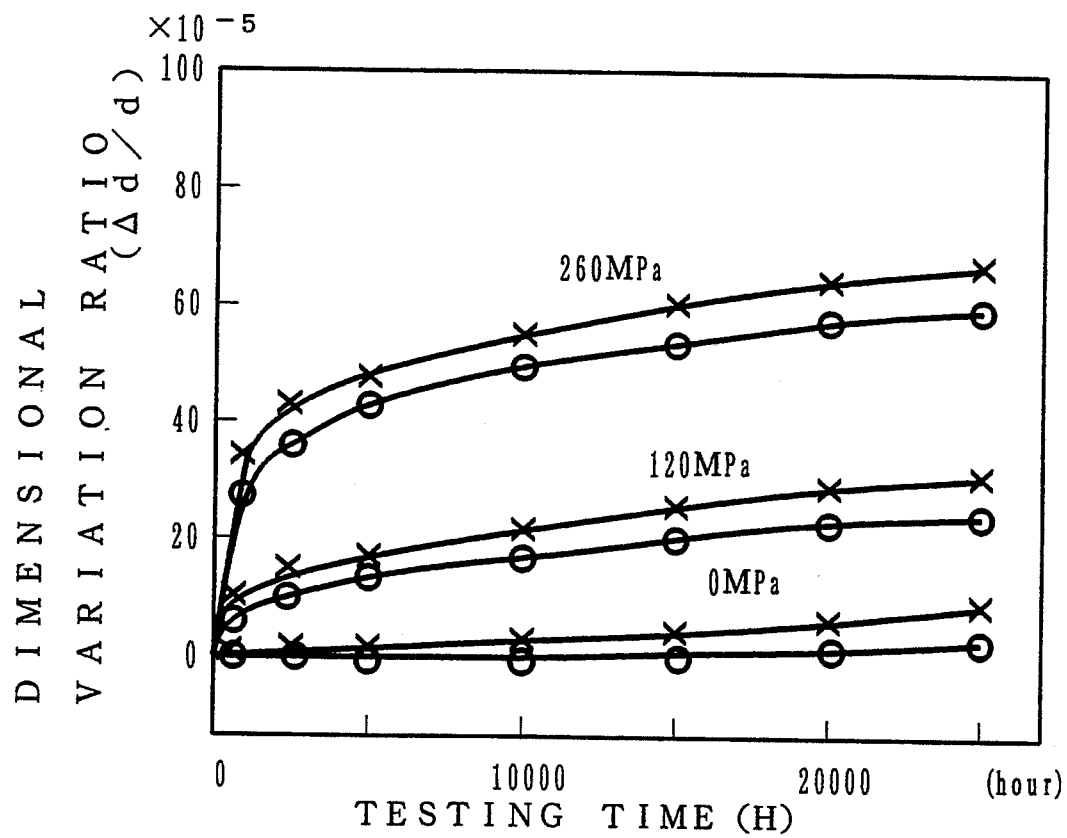
FIG. 11 is a graph showing the relationship between the dimensional variation ratio of inner rings and the aging time, as determined for bearings wherein Nos. 48 to 51 inner and outer rings were used.

The results given in FIGS. 11 and 12 and in Table 4 reveal that even when the inner and outer rings have an increased surface hardness and a reduced retained austenite content, the bearing rings retain satisfactory properties without degradation with respect to dimensional variation ratio, toughness, seizing time, etc.

The present invention may be embodied differently without departing from the spirit and basic features of the invention. Accordingly the embodiments herein disclosed are given for illustrative purposes only and should not be construed as being limitative in any way. It is to be understood that the scope of the invention is defined by the appended claims rather than by the specification and that all alterations and modifications within the definition and scope of the claims are included in the claims.

What we claim is:

1. A bearing component having a surface hardness of 63 to 67 in terms of Rockwell hardness C and a surface retained austenite content of at least 20% to less than 25%, said bearing component being prepared by subjecting a bearing component workpiece formed of a carburizing steel to a series of treatments including carburizing and quenching, said bearing workpiece having a carbon content of 0.1 to 1.0 weight % carbon.

2. A bearing component as defined in claim 1 which is 20 to 24.5% in surface retained austenite content.

3. A bearing component as defined in claim 1 for use in an anti-friction bearing as a bearing ring.

4. A bearing component as defined in claim 1 for use in a tapered roller bearing as a bearing ring.

5. A process for producing a bearing component having a surface hardness of 63 to 67 in terms of Rockwell hardness C and a surface retained austenite content of at least 20% to less than 25% including a step of carburizing and quenching a bearing component workpiece prepared from a carburizing steel and machined to a predetermined shape, the step of subjecting the resulting workpiece to a preliminary tempering treatment at 110° C. to 130° C. for at least one hour, the step of subjecting the tempered workpiece to a sub-zero treatment and the step of subjecting the treated workpiece to a main tempering treatment.

6. A process as defined in claim 5 wherein the sub-zero treatment is conducted by maintaining the workpiece at −50° to −80° C. for at least 1 hour.

7. A process as defined in claim 5 wherein the main tempering treatment is conducted by maintaining the workpiece at 140° to 175° C. for at least 2 hours.

8. A process as defined in claim 5 wherein a secondary hardening treatment is conducted after the carburizing and quenching step and before the preliminary tempering treatment.

9. A process for producing a bearing component having a surface hardness of 63 to 67 in terms of Rockwell hardness C and a surface retained austenite content of at least 20% to less than 25% including the step of carburizing and quenching a bearing component workpiece prepared from a carburizing steel and machined to a predetermined shape, the step of subjecting the resulting workpiece to a secondary hardening treatment and the step of subjecting the hardened workpiece to a main tempering treatment.

10. A process as defined in claim 9 wherein the secondary hardening treatment is conducted at a temperature of at least 800° C.

11. A process as defined in claim 9 wherein the secondary hardening treatment is conducted by press quenching.

12. A process as defined in claim 9 wherein the main tempering treatment is conducted by maintaining the workpiece at 140° to 175° C. for at least 2 hours.

13. A process as defined in claim 9 wherein the secondary hardening treatment is conducted by press quenching wherein the workpiece is held by a press and heated to 900° C. to 950° C. and quenched immediately after heating.

* * * * *